United States Patent [19]
Cords

[11] 3,766,829
[45] Oct. 23, 1973

[54] MODULAR AIRBORNE LAUNCHER

[75] Inventor: Ernest Cords, Palos Verdes, Calif.

[73] Assignee: Hughes Aircraft Company, Culver City, Calif.

[22] Filed: Oct. 4, 1971

[21] Appl. No.: 186,341

Related U.S. Application Data

[62] Division of Ser. No. 882,986, Dec. 8, 1969, abandoned.

[52] U.S. Cl............. 89/1.815, 89/1.817, 89/37.5 R
[51] Int. Cl............................................. F41f 3/04
[58] Field of Search................... 89/1.8, 1.815, 1.5, 89/1.816, 37.5; 102/7.2

[56] References Cited
UNITED STATES PATENTS

| | | | |
|---|---|---|---|
| 2,625,880 | 1/1953 | Brown | 102/7.2 |
| 3,122,056 | 2/1964 | Fitch et al. | 89/1.5 R |
| 3,167,278 | 1/1965 | Roberge | 89/1.815 X |
| 3,185,035 | 5/1965 | Humphries | 89/1.815 |
| 3,315,565 | 4/1967 | Nash | 89/1.807 |
| 2,865,584 | 12/1958 | Holloway | 89/1.5 F X |
| 3,608,426 | 9/1971 | Jackson, Jr. | 89/37.5 C |

*Primary Examiner*—Samuel W. Engle
*Attorney*—W. H. MacAllister Jr. et al.

[57] ABSTRACT

Missile-launching apparatus for mounting on aircraft, which enables conversion in the field between several configurations and which facilitates loading of missile containers in cramped locations. The apparatus includes a launching module having a central beam and a missile launcher on either side of the beam, the beam having mounts on its upper end for attachment to an aircraft bomb rack and mounted on its lower end for supporting another almost identical module. Each launcher includes a bulkhead at its front end, a debris tube at its rear end, and a gate at its center for receiving a missile-holding container. The missile container can be installed in a sideward direction by fully opening the gate, or in a front or rearward direction by pivoting open the bulkhead or debris tube. An arming handle is provided which sequentially moves a shear pin in the container to free the missile for launching, and then connects an electrical connector to the missile container.

5 Claims, 6 Drawing Figures

PATENTED OCT 23 1973

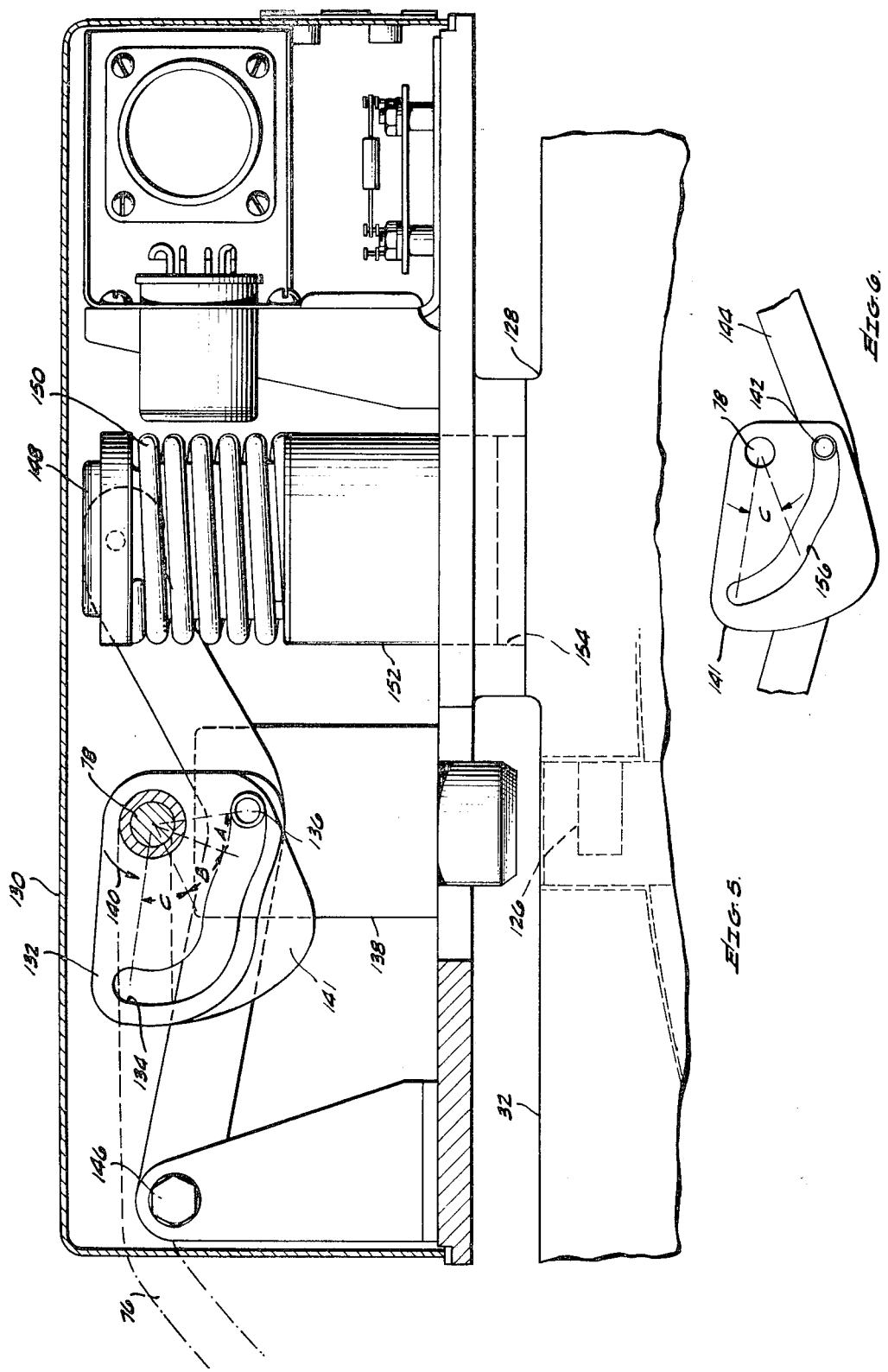

MODULAR AIRBORNE LAUNCHER

CROSS REFERENCE

This application is a division of patent application Ser. No. 882,986, filed Dec. 8, 1969, now abandoned by Ernest Cords for "Modular Airborne Launcher."

BACKGROUND OF THE INVENTION

1. Field of the Invention

This invention relates to weapon-launching apparatus for mounting on aircraft.

2. Description of the Prior Art

Many military aircraft are provided with launchers for firing rocket missiles. Typically, these launchers have included tubes hung below a supporting beam or held within a load-supporting shell. Completely different launchers had to be designed for different aircraft or different types of missions. For example, in missions where a greater number of rockets would be expected to be fired, a different launcher had to be installed that had more launch positions thereon. As another example, a launcher for fixed wing aircraft which can point at the target during bombing runs could not be used on helicopters which usually cannot make that type of run and which require launchers that can be adjusted in elevation. The many types of launchers required necessitated the complete development of several types of launchers, and the field warehousing of these different types of launchers. A missile launcher which could be changed to a variety of configurations in the field, could reduce the cost of development and warehousing of missile launchers.

It is generally preferable to load missile containers in a sideward direction, instead of from the front or rear, because the persons handling them generally prefer not to be located in front or in back of the missile. However, the launchers are often located on an aircraft so that they are not easily accessible for side loading, as where several launchers are located on adjacent store support stations. As a result, the missiles or containers must be loaded from the front or from the rear. A launcher that enabled side loading where space permitted, but which also facilitated end loading where required, would make it easier to maintain the launcher.

In many prior launchers wherein missiles were inserted into a launch tube, an electrical connection between the missile and the aircraft was made by hand fastening of wires. If the contact to which the missile was connected carried an electrical charge, it would be possible for the missile to be launched as soon as the connection was made. As a result, personnel standing in front or in back of the missile could be injured. It would be preferable to provide means for making electrical connections to the missile by operating a simple device such as a lever. This would enable connections to be made at the last moment before a mission, when almost all personnel are cleared from the area, so that if a missile fired, little, if any damage would be done.

OBJECTS AND SUMMARY OF THE INVENTION

An object of the present invention is to provide an airborne missile launcher of maximum versatility to enable its use in a variety of situations.

Another object is to provide an airborne missile launcher which is safe and easy to maintain.

In accordance with one embodiment of the present invention, launching apparatus is provided which can be used in a variety of applications, and which is easy and safe to handle. The apparatus includes launching modules, each having a central beam that can be attached to an aircraft, and a missile launcher on either side of the beam for holding a missile container. If it is desired to carry additional missiles on a mission, a second, or lower launching module nearly identical to the first or upper module, can be installed by attaching it to the bottom of the central beam of the upper module. Installation and removal of the lower module can be accomplished in the field. Also, an elevation mount which permits aiming can be attached in the field to the beam of a module to adapt the module for use on a helicopter. The fact that the lower launching apparatus is nearly identical to the upper launching apparatus, except for certain parts which can be removed or added in the field, and the fact that an elevation mount can be added or removed in the field, enables warehousing of a minimum number of parts.

Each launcher includes a bulkhead at its front, a debris control device at its rear, and a gate at its center. A container holding a missile is installed between these three parts of the launcher. Where space permits, the installation can be accomplished by opening the gate and pivoting down the bulkhead at the front. However, if there is insufficient space for side installation, the gate can be partially opened and the debris control device can be pivoted or removed to enable installation from the rear.

The launchers are constructed so that they are armed by moving down an arming handle. The arming handle moves a plunger into the missile container to move a shearing pin therein to a position wherein it can release the missile to allow it to be launched. The handle also moves an electrical connector into a socket on the missile container to enable firing currents to be carried thereto. The apparatus is constructed so that the electrical connection is made only after the shearing pin is moved to a firing position, so that if the aircraft firing controls were inadvertently energized, the missile will be launched from the aircraft instead of being held back by the high strength storage pin. The apparatus is also constructed to prevent movement of the arming handle to the arming position unless the gate which holds the container firmly in place, has been securely closed.

The novel features of the invention are set forth with particularity in the appended claims. The invention will be best understood from the following description when read in conjunction with the accompanying drawings.

BRIEF DESCRIPTION OF THE DRAWINGS

FIG. 5 is a sectional view of the arming mechanism taken on the line 5-5 of FIG. 2; and FIG. 6 is a partial view of the arming mechanism of FIG. 5.

DESCRIPTION OF THE PREFERRED EMBODIMENTS

Figure 1:
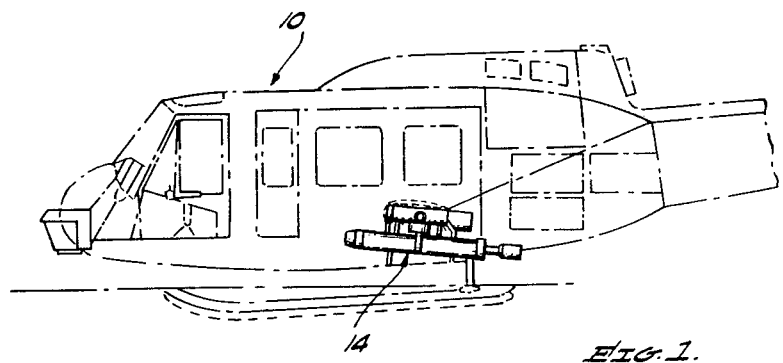
FIG. 1 is a side elevation view of a helicopter shown with the launching apparatus mounted thereon.
Figure 2:
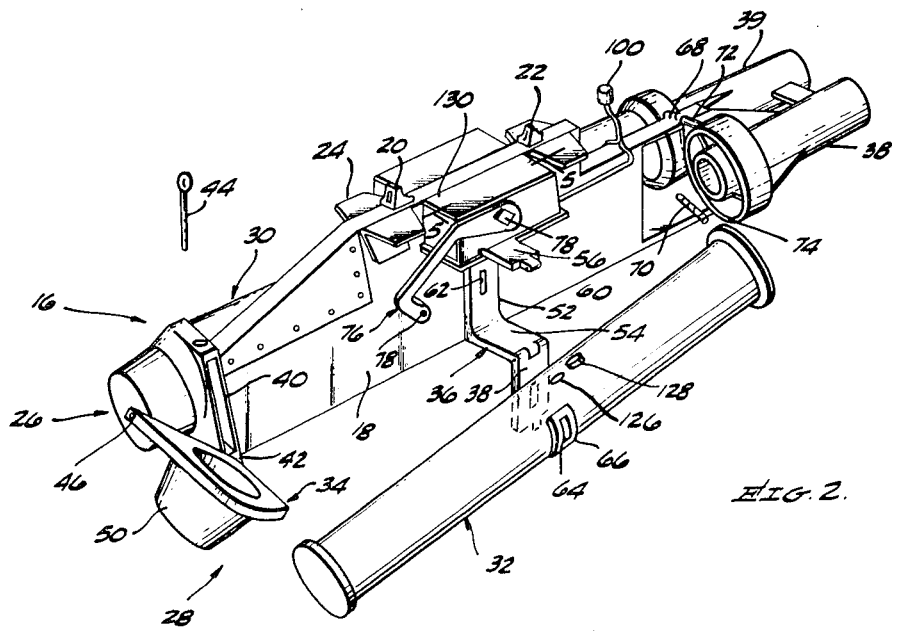
FIG. 2 is a perspective view of an upper launching apparatus, showing the manner in which a missile container may be installed therein.

FIG. 1 illustrates a helicopter 10 with a bomb mount 12 that holds launching apparatus 14 constructed in accordance with the invention. The launching apparatus 14 is a type which also can be installed on winged aircraft, with slight modification. FIG. 2 illustrates a launching module 16 in a configuration designed for mounting on winged aircraft, to carry two missiles thereon. The module includes a box beam 18, and missile launchers 26, 28 on either side of the beam. Each missile launcher is adapted to receive a missile container 30, 32 which contains a missile that can be fired from the container, with the container acting as a launch tube. A pair of bomb lugs 20, 22 fastened to the top of the beam can receive hooks on the bomb rack of an aircraft to hold the module thereon, and four sway brace pads 24 mounted on the beam can abut sway braces of the bomb rack to steady the launching apparatus thereon.

FIG. 2 illustrates the preferred sideward manner of installation of a missile container 32 in a launcher 28, which is the method generally used when there is sufficient space at the side of the launcher. The launcher includes a bulkhead 34 at the front of the launcher, a gate assembly 36 at the center of the launcher, and a debris control device 38 at the rear of the launcher. In order to install the missile container 32 from the side, the front bulkhead 34 must be pivoted down and the gate assembly 36 must be opened.

The front bulkhead 34 is pivotally mounted on a bracket 40 on the box beam, by means of a trunnion 42 at the lower end of the bulkhead that is engaged with the bracket. After a missile container is installed, the front bulkhead is pivoted to an upright position, and it is held in this position by a pin 44 that projects through a pair of holes 46 in a clevis joint on the top of the bulkhead, and through a hole 48 at one side of the bracket. The bulkhead 34 includes a tube 50 whose rear end fits into a cut-out portion of the bulkhead.

The gate assembly 36 includes a gate bracket 52 fixed to the box beam 18. The bracket 52 has a lower portion 54 and an upper portion 56. A gate lever 38 is pivotally mounted on the lower portion and has an end which can be received within a clevis on the upper bracket portion. After a missile container is installed, the gate lever 38 is pivoted to its upright position and latched in place by a pin 60 held on a lanyard to the upper portion of the bracket. The pin 60 can project through holes in the gate lever 38 and upper bracket portion 56. The lanyard is of a length to prevent the pin 60 from fully retracting from the bracket. In order to assure firm engagement between the launcher and the missile container, the gate is provided with a pair of bosses 62, one on the gate bracket 52 and the other on the gate lever 38. These bosses engage a pair of corresponding recesses 64 on a saddle 66 of the missile container.

The debris control device 38 of the missile launcher 28 is fixed to another similar debris control device 39 of the other launcher 26. Both debris control devices 38, 39 are pivotally coupled to an upper portion of the box beam at a hinge 68 and to a lower portion of the box beam at a hinge 70. The hinges 68, 70 are similar, and each includes a hinge member on the box beam, a corresponding hinge member on the bracket of the debris control devices, and a pin 72 or 74 for holding the hinges together. When it is desired to load a missile container from the rear of the launcher, one of the pins 72 or 74 is pulled out. This enables the debris control devices to be pivoted up or down, depending on where there is room to receive the pivoted debris control devices. The debris control devices do not touch the rear end of the missile container when they are in their use position. Their purpose is to direct the exhaust from the missile in a rearwardly direction. If such devices were not included, the exhaust and metal and plastic parts from the missile that are projected back from it might hit the aircraft and damage it. It may be noted that in rearward loading of a missile container, the gate 36 must be opened slightly, but there is no need for a clear sideward space for receiving the missile container.

The sideward loading of the missile container 32 is accomplished by opening the gate 36 and swinging down the front bulkhead 34 as shown in FIG. 2. The missile container 32 is then placed in position, the gate lever 38 is swung up, and the pin 60 is projected through holes in the gate lever and upper portion of the gate bracket to secure the missile in place. After this, the bulkhead 34 is swung to an upright position and the pin 44 is inserted through holes in the bulkhead and bracket 40 to lock the bulkhead in an upright position. After missiles have been properly installed in both launchers 26, 28, the apparatus is ready for arming.

Arming of the missiles in the missile containers is accomplished by pivoting down an arming handle 76, the arming handle being fixed to a shaft 78 which is pivotally mounted with respect to the beam 18. The arming handle 76 is not pivoted down until a time immediately prior to a mission, to prevent accidental firing of a missile. It is possible to wait until the last moment, because the handle can be pivoted down and locked in place in only a few seconds. In order to assure that the gate lever 38 is firmly anchored in a closed position, the arming handle 76 is constructed so that it cannot be fully turned unless the pin 60 has been fully inserted into the holes in the upper bracket portion 56 and gate lever 38. After the arming handle has been pivoted to its lowest position, a pin is inserted through a hole 78 in the arming handle and a corresponding hole in the gate lever 58 to lock the arming handle down.

Figure 3:
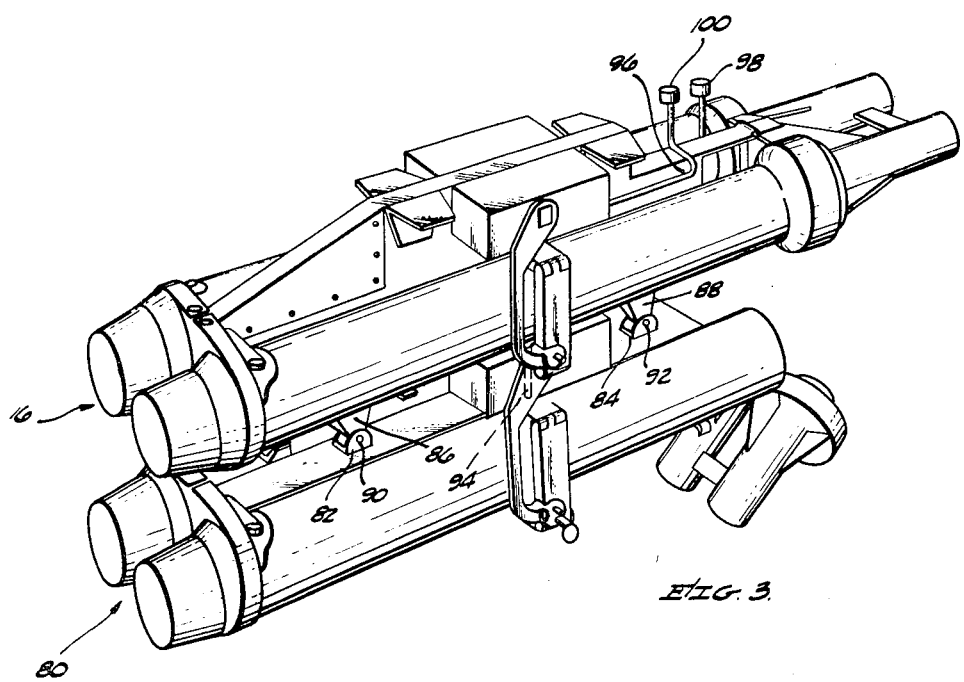
FIG. 3 is a perspective view of the launcher of FIG. 2 with a lower launching apparatus installed thereon.

FIG. 3 illustrates launching apparatus which includes the upper launching module 16 shown in FIG. 2, and an additional expansion launching module 80. The additional or lower module 80 can be attached to the upper module for use in missions where extra missiles must be carried, and removed for those missions where a minimum number of missiles are required, to reduce weight and drag. The lower module 80 is similar to the upper module, except that an upper portion of the box beam is eliminated, and a pair of mounting lugs 82, 84 is included. To enable attachment of the expansion or lower module to the upper module, a pair of supporting lugs 86, 88 is attached to the lower end of the box beam of the upper module. Mounting holes are provided at the top and bottom of the box beams of the modules to enable the lugs to be quickly attached thereto. A pair of bolts 90, 92 ties the lugs together to support the lower module on the upper one, and a pair of sway brace studs 94 located at the center of the modules on each side of the box beams, braces the expansion module against swaying with respect to the upper module.

The upper and lower modules 16, 80 are formed from identical modules, with only minor alterations to them. The preparation of an upper module 16 to accept an expansion or lower module involves the attachment of the lugs 86, 88 to the bottom of the beam, and the tying down of an electrical cable 98 to the upper beam portion 96 of the upper module. The upper module has a similar cable 100. In addition, the attachment of the expansion module requires the insertion and securing of a pair of bolts 90, 92 to connect the lugs of the two modules. The relatively simple manner of conversion, which enables it to be performed in the field, reduces the number of modules which must be warehoused, and reduces the number of modules which must be designed and developed.

Figure 4:
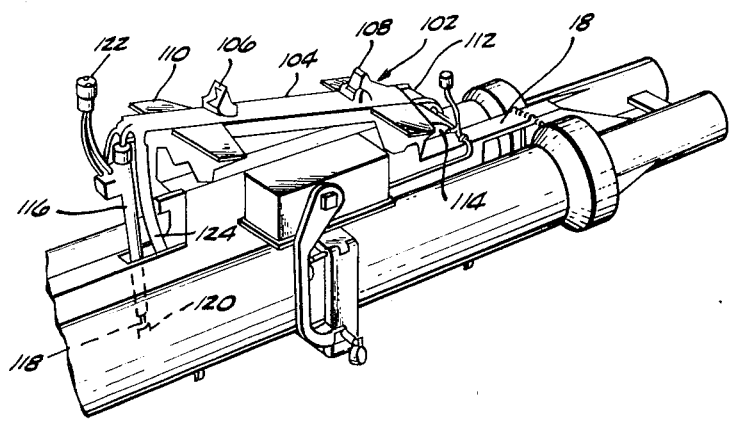
FIG. 4 is a partial perspective view of the launching apparatus of FIG. 2 with an elevation adjusting coupling installed thereon.

FIG. 4 illustrates a conversion of the module of FIG. 2 for use on a helicopter. The module as shown in FIG. 2 is designed for mounting on a bomb rack of a fixed wing aircraft so that it always points in the same direction. This manner of mounting is adequate for winged airplanes which can dive at a ground target so that the missiles point at the target. However, helicopters are not well adapted to diving runs, and it is desirable to provide means for adjusting the elevation angle of the launchers to enable firing at a ground target, without substantial tilting of the helicopter. In order to enable such adjustment in elevation, an elevation mount 102 is provided which can be attached to the box beam of the launching module to hold it to a bomb rack on a helicopter.

The elevation mount 102 includes an elevation beam 104 with a pair of bomb lugs 106, 108 and four sway brace pads 110, all of these being similar to the bomb lugs and sway brace pads on the apparatus of FIG. 2. The beam 104 has a rear end 112 that is pivotally mounted on a bearing bracket 114 that is attached to the top of the box beam 18 of the launching module. The forward end of the elevation beam carries a hydraulic cylinder 116 with a piston whose outer end is pivotally coupled at 118 to a bracket 120 on the box beam 18. A hydraulic coupling 122 which can be coupled to a hydraulic line on a helicopter, carries pressured fluid to the cylinder to move the piston therein in and out to pivot the box beam 18 up and down so as to aim the missiles in elevation. A guide rod 124 is also provided which slides in a slide bearing (not shown), within the box beam, to stabilize the launching module while allowing it to pivot up and down.

Referring again to FIG. 2, the missile within the missile container 32 is braced against forward and backward movement within the container by a shearing pin 126 that holds the missile in place in the container. The size of shearing pin required to hold the missile during handling is too large for the missile to shear during launching. Accordingly, the shearing pin is provided with a narrow portion which can be placed in position for shearing during actual launch of the missile. An outer end of the shearing pin 126 is accessible to the outside, and it is biased toward a position suitable for storage. However, prior to launching of the missile, the shearing pin 126 must be pushed in to move a thick portion of the pin out of the shearing position and to bring a narrow portion of the pin into position. The container also has a socket 128 which is designed to receive an electrical connector from the launching apparatus which can deliver currents that ignite the missile and perform any other control functions. The apparatus for pushing in the shearing pin 126 and attaching a connector to the socket 128 are contained in an arming housing 130 of the module.

FIG. 5 illustrates details of the arming mechanism within the arming housing 130. The mechanism is operated by cams attached to the shaft 78 to which the arming handle 76 is attached. The arming handle carries a shear pin actuating cam 132 with a slot 134 that engages a plunger pin 136 which is attached to a plunger 138. As the arming handle 76 is pivoted down, the cam pivots in the direction of arrow 140 and it causes the plunger 138 to move down. The plunger, which serves as readying means for moving the shearing pin to a launching position, pushes the shear pin 126 further into the container 32, so that the pin holds the missile only by a thin shear pin section to enable the missile to be launched. The plunger 138 begins to move down only after the cam has rotated by the angle A, and the plunger reaches its lowest position when the cam has rotated by another angle B. During the last period of cam rotation, when it rotates through the angle C, the plunger does not move up or down.

The shaft 78 carries another cam 141 which is shown in FIG. 6. This cam 141 engages a pin 142 which is fixed to a connector actuating arm 144. As shown in FIG. 5, the connector actuating arm 144 has one end pivotally mounted at 146 to a bracket on the arming housing and an opposite end pivotally mounted on a connector actuating plate 148. The connector actuating plate 148 is coupled through a spring 150 to a connector 152. The connector 152 can slide through a hole 154 in the arming housing and into the connector socket 128 of the missile container, to establish electrical connections with the container. The camming slot 156 in the connector actuating cam 141 does not begin moving the lever 144 until the arming handle shaft has moved through the angles A and B, and it then moves down the top plate 148 during pivoting through the angle C. Actually, two connector operating arms 144 are provided to push down the connector in a manner to prevent binding.

As mentioned above, the plunger 138 moves down during the period when the arming handle shaft moves through the angle B, which is prior to the downward movement of the connector 152. The construction which assures this sequence of operations is designed to provide added safety. It is possible for the firing apparatus in the aircraft to be set to deliver signals directing the firing of a missile at the time when the missile is armed. This may be caused either because the firing controls have been operated or because there is a malfunction in the aircraft that causes such signals to be delivered. If this should be the case, then the missile will be fired immediately upon the insertion of the connector 152 in the container socket 128. If the shear pin 126 were not pushed in by the plunger 138 at the time the missile was launched, then the missile might not be able to break the shear pin when accidentally fired. Accordingly, the missile might blow up inside the launcher, causing fatal injuries to the person arming the missile. Such an occurrence is prevented by the construction of the mechanism, which assures movement of the shearing pin to the firing position prior to the movement of the connector into the container socket, regardless of mistakes that might be made by personnel handling the apparatus. Even proper launching of a missile when the arming handle is moved down is hazardous. Accordingly, the operating instructions generally call for clearing the area in front of the aircraft at the time the arming handle is moved to the arming position.

The launching apparatus is constructed to enable field removal and replacement of various parts of the launching module. For example, the tube 50 of the bulkhead 34 at the front of each launcher can be replaced by another longer tube than that shown. A longer tube is often provided for operations in very cold climates. For many missiles, the launching charge should be completely burned before the missile leaves the launch tube or container. This is because the exhaust can puncture the front membranes of the adjacent containers. This would expose the missile to the environments and to possible icing. When the propellent is colder, it burns slower and may still be burning as it leaves the front bulkhead. To prevent damage to the adjacent missile, bulkheads with longer tubes can be provided for use under extremely cold conditions. Such longer tubes can be quickly installed in the field.

Thus, the invention provides launching apparatus utilizing a basic type of launching module which can be adapted to many configurations in the field. As mentioned above, one adaptation is the combination of two launching modules to carry four missiles on a mission, and another is to enable the installation and removal of an elevation support to adapt the module for use on a helicopter or fixed wing aircraft. The easy conversion of the basic module is largely due to the fact that it utilizes a central beam upon which other parts are hung. Thus, an additional module can be attached by attaching it to the beam, and the module can be supported by an elevation support by attaching the elevation support to the beam, the beam being made strong enough to allow for these modifications. The launching apparatus also enables use in many types of aircraft where there may be cramped quarters, to enable the preferred side loading of missile containers when there is room and to enable end loading when there is no room for side loading. The apparatus is also constructed for safety in arming, by assuring that the missile container is held well in place prior to arming, and by assuring that the missile can be launched prior to the making of electrical connections which could carry launching currents to the missile.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. Apparatus for mounting on an aircraft bomb rack comprising:
   an elongated center beam having upper and lower ends;
   first mounting means mounted on said upper end of said beam for removable attachment to a bomb rack so that said beam hangs down below a bomb rack when mounted on a bomb rack; and
   means on either side of said beam for holding a missile container, said means on either side of said beam for holding a missile container including a front bulkhead, means for pivotally mounting said bulkhead on said beam, means for locking said bulkhead in an upright position, a gate pivotally coupled to said beam, and means for locking said gate in a closed position.

2. Apparatus for mounting on an aircraft bomb rack to launch missiles comprising:
   first and second center beams, each having upper and lower portions;
   first mounting means for removably attaching said upper portion of said first beam to an aircraft bomb rack so that said first beam hangs down in a substantially vertical direction therefrom;
   second mounting means for removably attaching said upper portion of said second beam to said lower portion of said first beam so that said second beam hangs substantially vertically from said first beam;
   means mounted on either side of each of said beams for holding a missile container,
   each of said means for holding a missile container including a gate with a gate bracket fixed to said beam and a gate lever pivotally mounted on said bracket for swinging open to receive a missile container and swinging closed to lock the missile container in position; and including:
   a pair of debris-control devices, one of said debris-control devices being disposed on either side of each of said beams at the rear end thereof;
   pivot means for pivotally supporting said debris-control devices on said beams to enable them to be swung out of alignment with a missile container held by said gate means; and
   means for locking said debris-control devices on said beams to fix their positions thereon, to enable loading by fully opening said gate means and by swinging said debris-control devices out of the way.

3. Apparatus for mounting on an aircraft bomb rack to launch missiles comprising:
   first and second center beams, each having upper and lower portions;
   first mounting means for removably attaching said upper portion of said first beam to an aircraft bomb rack so that said first beam hangs down therefrom;
   second mounting means for removably attaching said upper portion of said second beam to said lower portion of said first beam so that said second beam hangs from said first beam; and
   means mounted on either side of said beams for holding a missile container, said means for holding a missile container comprises:
   a gate that includes gate bracket means attached to said beam, and a gate lever pivotally mounted on said gate bracket means for pivoting open to receive a missile container and pivoting closed to retain the container in place;
   a front bulkhead disposed at the front of said beam;
   means for pivotally mounting said front bulkhead on said beam to enable said bulkhead to be pivoted out of the way during installation of a missile container; and
   means for locking said bulkhead in an upright position to capture a front end of said missile container.

4. Missile-launching apparatus comprising:
   supporting beam means for attachment to an aircraft, said beam means having front, center, and rear portions;
   a gate mounted on said center portion of said beam means for opening to receive a missile container and closing to trap said container on said beam means;

front bulkhead means mounted on said front portion of said beam for engaging a front portion of said missile container;

debris control means pivotally mounted on said rear portion of said beam means for pivoting from a use position wherein it directs debris from said missile container in a rearwardly direction, and an installing position wherein it is pivoted out of line with said missile container to enable installation or removal of said container; and means for fixing the position of said debris control device at said use position.

5. The apparatus described in claim 4 wherein:

said supporting beam means has an upper portion which includes means for attachment to an aircraft bomb rack so that said beam means hangs down in a substantially vertical orientation; and wherein said gate, bulkhead means, and debris control means are mounted on one side of said beam means; and including a second gate, second front bulkhead means, and second debris control means mounted on a side of said beam means opposite said first side thereof.

* * * * *